(12) United States Patent
Zeng et al.

(10) Patent No.: US 8,314,774 B1
(45) Date of Patent: Nov. 20, 2012

(54) METHOD AND APPARATUS FOR QUASI-3D TRACKING USING 2D OPTICAL MOTION SENSORS

(75) Inventors: Ke-Cai Zeng, Fremont, CA (US); Yansun Xu, Mt. View, CA (US); John Frame, Arcadia, CA (US); Brett A. Spurlock, Los Altos, CA (US); Steven Sanders, Belmont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1051 days.

(21) Appl. No.: 11/825,887

(22) Filed: Jul. 9, 2007

(51) Int. Cl.
*G06F 3/033* (2006.01)
*G09G 5/08* (2006.01)

(52) U.S. Cl. ......... 345/167; 345/157; 345/158; 345/163

(58) Field of Classification Search ........... 345/163–167
See application file for complete search history.

(56) References Cited

U.S. PATENT DOCUMENTS

| | | | |
|---|---|---|---|
| 3,922,093 A | 11/1975 | Dandliker et al. | |
| 4,546,347 A | 10/1985 | Kirsch | |
| 4,799,055 A | 1/1989 | Nestler et al. | |
| 4,936,683 A | 6/1990 | Purcell | |
| 5,162,780 A * | 11/1992 | Solhjell | 345/164 |
| 5,288,993 A | 2/1994 | Bidiville et al. | |
| 5,345,527 A | 9/1994 | Lebby et al. | |
| 5,473,344 A | 12/1995 | Bacon et al. | |
| 5,561,445 A * | 10/1996 | Miwa et al. | 345/163 |
| 5,578,813 A | 11/1996 | Allen et al. | |
| 5,606,174 A | 2/1997 | Yoshimura et al. | |
| 5,644,139 A | 7/1997 | Allen et al. | |
| D382,550 S | 8/1997 | Kaneko et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Dandliker et al. | |
| 5,781,229 A | 7/1998 | Zediker et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A | 5/1999 | Dandliker et al. | |
| 5,963,197 A | 10/1999 | Bacon et al. | |
| 5,994,710 A | 11/1999 | Knee et al. | |
| 6,031,218 A | 2/2000 | Piot et al. | |
| 6,037,643 A | 3/2000 | Knee | |
| 6,057,540 A | 5/2000 | Gordon et al. | |
| 6,097,371 A | 8/2000 | Siddiqui et al. | |
| 6,130,664 A * | 10/2000 | Suzuki | 345/163 |
| 6,151,015 A | 11/2000 | Badyal et al. | |
| 6,172,354 B1 | 1/2001 | Adan et al. | |
| 6,225,617 B1 | 5/2001 | Dandliker et al. | |
| 6,233,368 B1 | 5/2001 | Badyal et al. | |
| 6,256,016 B1 | 7/2001 | Piot et al. | |
| 6,281,881 B1 | 8/2001 | Siddiqui et al. | |
| 6,281,882 B1 | 8/2001 | Gordon et al. | |
| 6,326,950 B1 | 12/2001 | Liu | |

(Continued)

*Primary Examiner* — Kevin M Nguyen
*Assistant Examiner* — Kenneth B Lee, Jr.

(57) ABSTRACT

One embodiment relates to a user input device for tracking motion. The device includes a tracking ball and a user-accessible touching area for user manipulation of the tracking ball. First and second two-dimensional sensors are positioned at tracking heights away from the tracking ball. The first two-dimensional sensor may be positioned across the tracking ball and opposite to the user-accessible touching area. The second two-dimensional sensor may be positioned at an angle with respect to a z-axis defined as extending from the user-accessible touching area through a center of the tracking ball to the first two-dimensional sensor. Other embodiments, aspects and features are also disclosed.

10 Claims, 4 Drawing Sheets

U.S. PATENT DOCUMENTS

| | | |
|---|---|---|
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,618,038 B1 | 9/2003 | Bohn |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 7,557,795 B2 * | 7/2009 | Kong et al. .................. 345/156 |
| 2002/0130835 A1 | 9/2002 | Brosnan |
| 2002/0158300 A1 | 10/2002 | Gee |
| 2002/0190953 A1 | 12/2002 | Gordon et al. |
| 2003/0034959 A1 | 2/2003 | Davis et al. |
| 2003/0058506 A1 | 3/2003 | Green et al. |
| 2003/0142288 A1 | 7/2003 | Kinrot et al. |
| 2003/0169235 A1 * | 9/2003 | Gron et al. .................. 345/167 |
| 2004/0084610 A1 | 5/2004 | Leong et al. |
| 2004/189593 A1 | 9/2004 | Koay |
| 2005/0024336 A1 | 2/2005 | Xie et al. |
| 2005/0024623 A1 | 2/2005 | Xie et al. |
| 2005/0083303 A1 | 4/2005 | Schroeder et al. |
| 2007/0146325 A1 * | 6/2007 | Poston et al. .................. 345/163 |

* cited by examiner

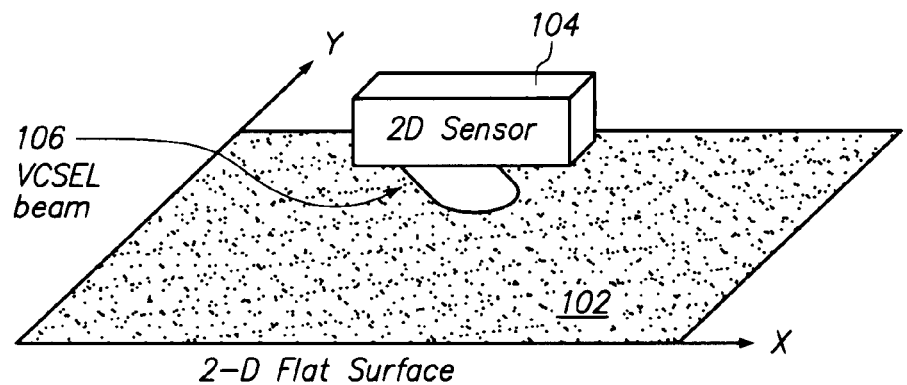
FIG. 1
(Conventional)

METHOD AND APPARATUS FOR QUASI-3D TRACKING USING 2D OPTICAL MOTION SENSORS

TECHNICAL FIELD

The present invention relates generally to an optical positioning device (OPD), and methods of sensing movement using same.

BACKGROUND

User input devices, such as computer mice, touch screens, trackballs and the like, are used for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse.

It is highly desirable to improve user input devices.

BRIEF DESCRIPTION OF THE DRAWINGS

FIG. 1 is a schematic diagram of select components of a user input device for tracking motion over a two-dimensional surface.

DETAILED DESCRIPTION

User input devices include mouse devices, trackballs, and other such devices. Applicants have observed that trackball type of user input devices often have a "blind spot" in terms of the type of motion detected. In particular, such user input devices are typically deficient at tracking a certain rotational component of any arbitrary motion by a user. This limitation is discussed as follows in relation to FIGS. 1 and 2.

FIG. 1 is a schematic diagram of select components of a user input device 100 for tracking motion over a two-dimensional (2D) surface 102. Such a user input device 100 may comprise, for example, a mouse input device. As shown, components of the user input device may include a two-dimensional (2D) sensor apparatus 104. The 2D sensor apparatus 104 may include a laser, for example, a vertical-cavity surface-emitting laser (VCSEL), or a light emitting diode (LED) device to generate an optical beam 106 and a two-dimensional optical motion sensor device well positioned to detect either a reflected or a scattered optical signal from the moving surface, which carries the motion information. There are various type of optical motion sensing technologies, such as laser-speckle-pattern translation based, image correlation based, frequency Doppler shift based, and so on.

Using such a user input device 100, motion of the 2D sensor apparatus relative to the 2D flat surface may be tracked. More particularly, the user input device 100 is capable of tracking x and y displacements of the user input device relative to the flat surface, where x and y are the usual Cartesian coordinates. However, of particular interest in this disclosure, the user input device 100 is typically deficient at tracking a polar rotation of the device relative to the surface.

By polar rotation, it is meant a rotation of the sensor relative to the surface where the radius of the rotation is zero. In other words, consider a polar coordinate system centered at the current position of the sensor with r as the radius and θ as the polar angle. The 2-D sensor would be typically deficient at tracking motion in the polar angle θ. This is because such polar rotation merely results in any effective speckle pattern translation, or imaging correlation change, or laser frequency Doppler shift, from which motion information may be deduced by the 2D optical sensor device. The 2D sensor device may be a laser speckle pattern translation based, or an image correlation change based, or a laser Doppler frequency shift based, or other type of optical motion sensor device.

Figure 2:
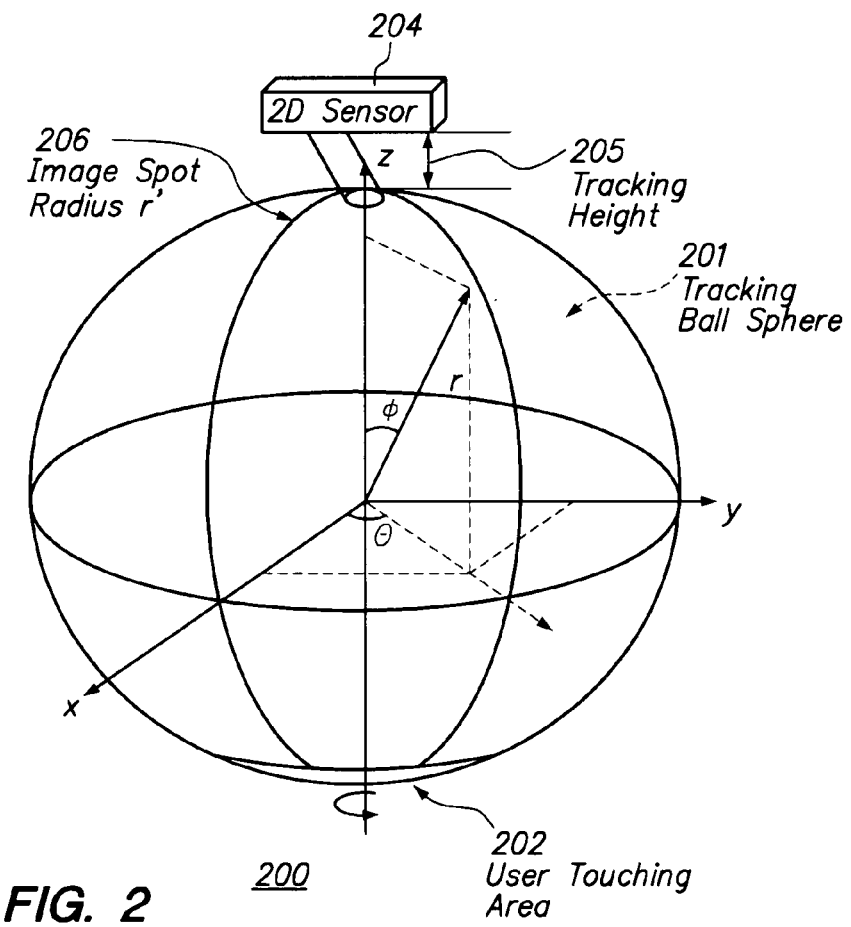
FIG. 2 is a schematic diagram of select components of a user input device for tracking motion using a tracking ball.

FIG. 2 is a schematic diagram of select components of a user input device 200 for tracking motion using a tracking ball or sphere 201. As shown, components of the user input device 200 may include a user-accessible touching area 202 on the tracking ball 201, and a two-dimensional (2D) sensor apparatus 204. The 2D sensor apparatus 204 may be positioned at a tracking height 205 away from the tracking ball 201. The 2D sensor apparatus 204 may also include an optical device to generate an optical beam which creates an image spot 206 of radius r' on the tracking ball. The 2D optical motion sensor apparatus may further include a 2D sensor device positioned to detect either a laser speckle pattern translation, or a surface image correlation change, or a laser Doppler frequency shift.

In addition, applicants show a spherical coordinate system in FIG. 2. The spherical coordinate system has its origin at the center of the tracking sphere 201. The spherical coordinate system includes r as the radial distance from the origin, θ as the azimuth angle from positive x-axis, and φ as the zenith angle from the positive z-axis.

Applicants have observed that the user input device 200 is generally capable of tracking displacements in the zenith angle φ (at fixed azimuth angle θ) of the tracking sphere 201 relative to the flat surface. (This capability effectively allows the user input device 200 to track motion in the "x" and "y" directions.) However, of particular interest in this disclosure, the user input device 200 is typically deficient at tracking azimuthal rotations (i.e. θ rotations) of the tracking sphere 201. This is because such azimuthal rotation merely results in an any effective or detectable speckle pattern translation, or imaging correlation change, or laser Doppler frequency shift on the 2D optical motion sensor device. Again, the 2D optical motion sensor device may be a speckle pattern translation based, or an image correlation based, or a laser Doppler frequency shift based optical sensor device.

The present application provides methods and apparatus for overcoming or circumventing the above-discussed limitations. Example embodiments are discussed as follows in relation to FIGS. 3, 4 and 5. For purposes of simplicity of illustration, the laser beam outputs, image spots, and other conventional features are not depicted in FIGS. 3, 4 and 5.

Figure 3:
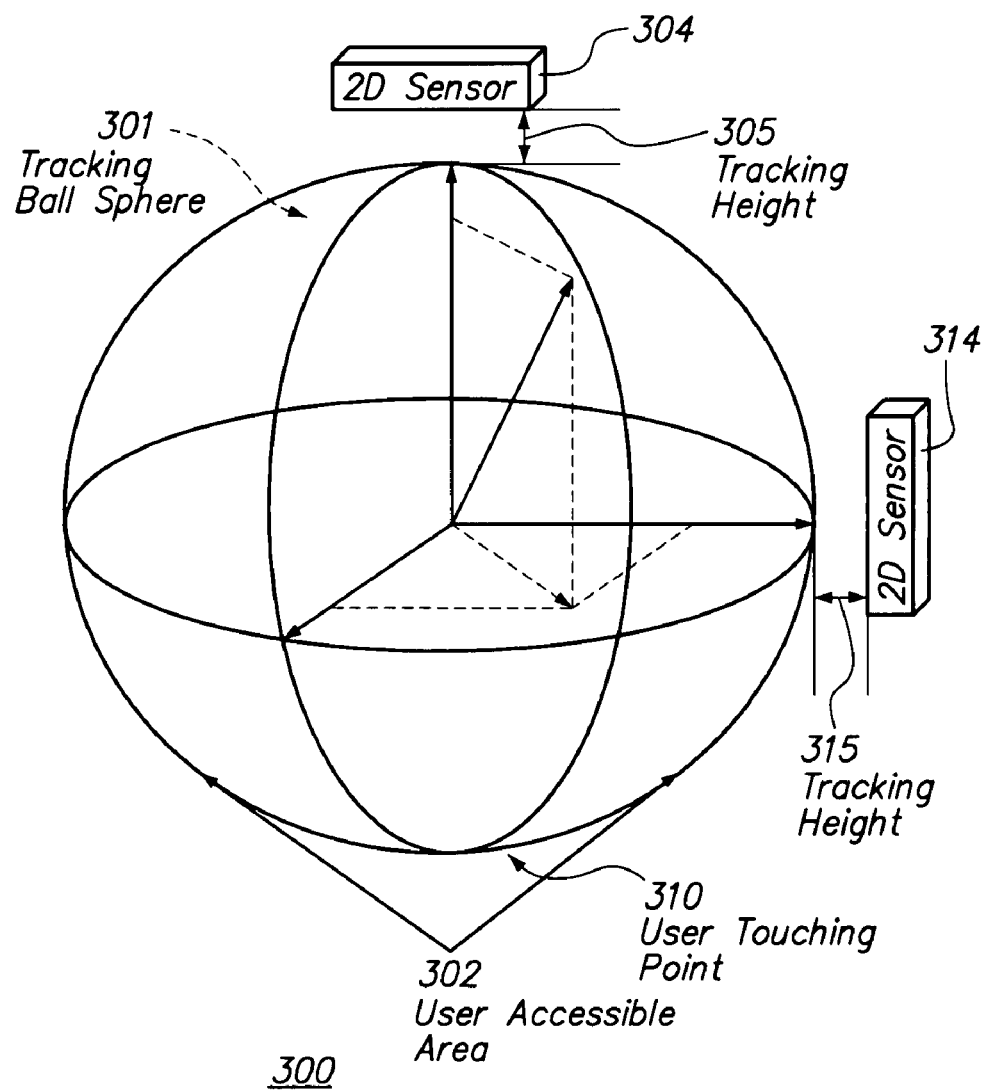
FIG. 3 is a schematic diagram of select components of a user input device for tracking motion in a full quasi three-dimensional manner in accordance with an embodiment of the invention.

FIG. 3 is a schematic diagram of select components of a user input device for tracking motion in a full quasi three-dimensional manner in accordance with an embodiment of the invention. A full 3-D motion is a motion in spherical coordinates where any of spherical coordinates, e.g. θ, φ, and r, can change. However, a full quasi 3D motion is a motion in spherical coordinates where either θ or φ can change but r remain constant. A quasi 3D motion is thus not a full 3D motion, but is more than a 2D motion. As discussed above, any such quasi 3-D motion component as resulted from the changing of the θ-coordinate of the tracking ball may remain undetected by the 2D sensor in the user input device. As shown in FIG. 3, components of the user input device 300 may include a user-accessible touching area 302 on the tracking ball 301, and two two-dimensional (2D) sensor apparatus 304 and 314.

A first 2D sensor apparatus 304 may be positioned opposite of a user touching point 310 at a tracking height 305 away from the tracking ball 301. Per the spherical coordinate system introduced in FIG. 2, the first 2D sensor apparatus 304 may be positioned at φ=0.

A second 2D sensor apparatus 314 may be positioned opposite of a user touching point 310 at a tracking height 315 away from the tracking ball 301. Per the spherical coordinate system, the second 2D sensor apparatus 314 may be positioned at φ=90 degrees.

In accordance with an embodiment of the invention, by combining the two (or more) 2D sensor apparatus, full quasi 3D tracking is enabled. For example, in the configuration shown in FIG. 3, the first 2D sensor apparatus 304 tracks changes in φ (at fixed θ) in an effective manner. In other words, the first 2D sensor apparatus 304 provides a measurement which is sensitive to dφ/dt. Meanwhile, changes in θ are effectively tracked by the second 2D sensor apparatus 314. In other words, the second 2D sensor apparatus 314 provides a measurement which is sensitive to dθ/dt. Hence, the second 2D sensor 314 effectively covers the "blind spot" of the first 2D sensor 304.

In some circumstances, cost may be an issue, and motion dead zones may be tolerated to some extent. In those cases, it may be desirable to use only one 2D sensor while circumventing the dead zone issue. Such an embodiment is described as follows in relation to FIG. 4.

Figure 4:
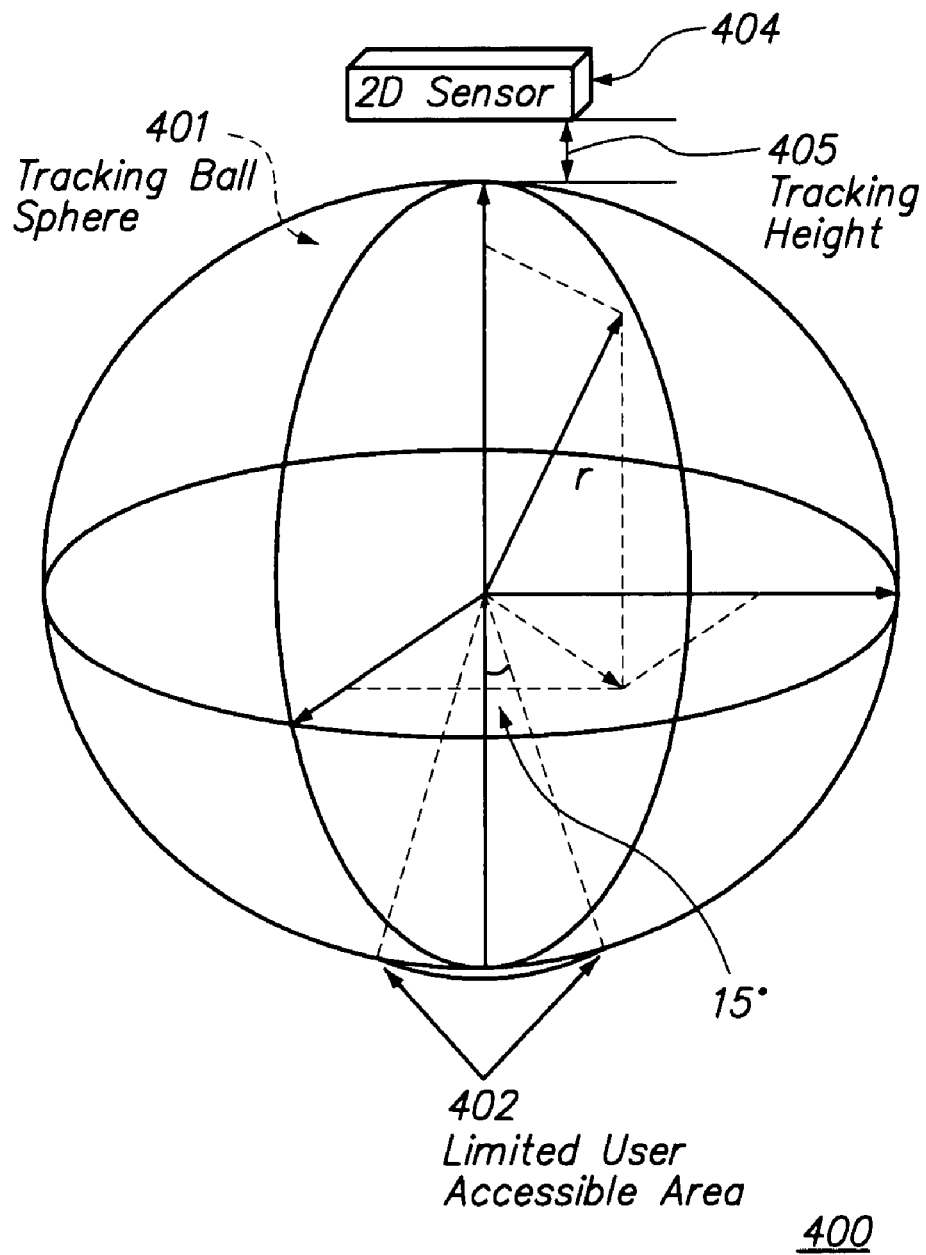
FIG. 4 is a schematic diagram of select components of a user input device for tracking motion using a tracking ball configured with a limited user accessible area in accordance with an embodiment of the invention.

As shown in FIG. 4, the user input device 400 has a single 2D sensor apparatus. The 2D sensor apparatus 404 is positioned opposite from a limited user accessible area 402 at a tracking height 405 from the tracking ball 401.

The limited user accessible area 402 is restricted in terms of the solid angle which the user may touch. For example, the restriction may be implemented by providing a smaller opening in a top surface or cover through which a user may manipulate the tracking ball. For example, as depicted, the user accessible area 402 may be preferably limited so that the accessible area is within 15 degrees from the z-axis. This may be denoted as $|\phi| \leq 15°$ which corresponds to a solid angle of $\Omega=2\pi(1-\cos 15°)=0.214$. By so limiting the user-accessible area 402, the user's ability to rotate the tracking ball 401 so as to cause dφ/dt becomes curtailed. Hence, the physical velocity of the tracking ball become more closely related to the tracking velocity measured by the single 2D sensor apparatus 404.

Figure 5:
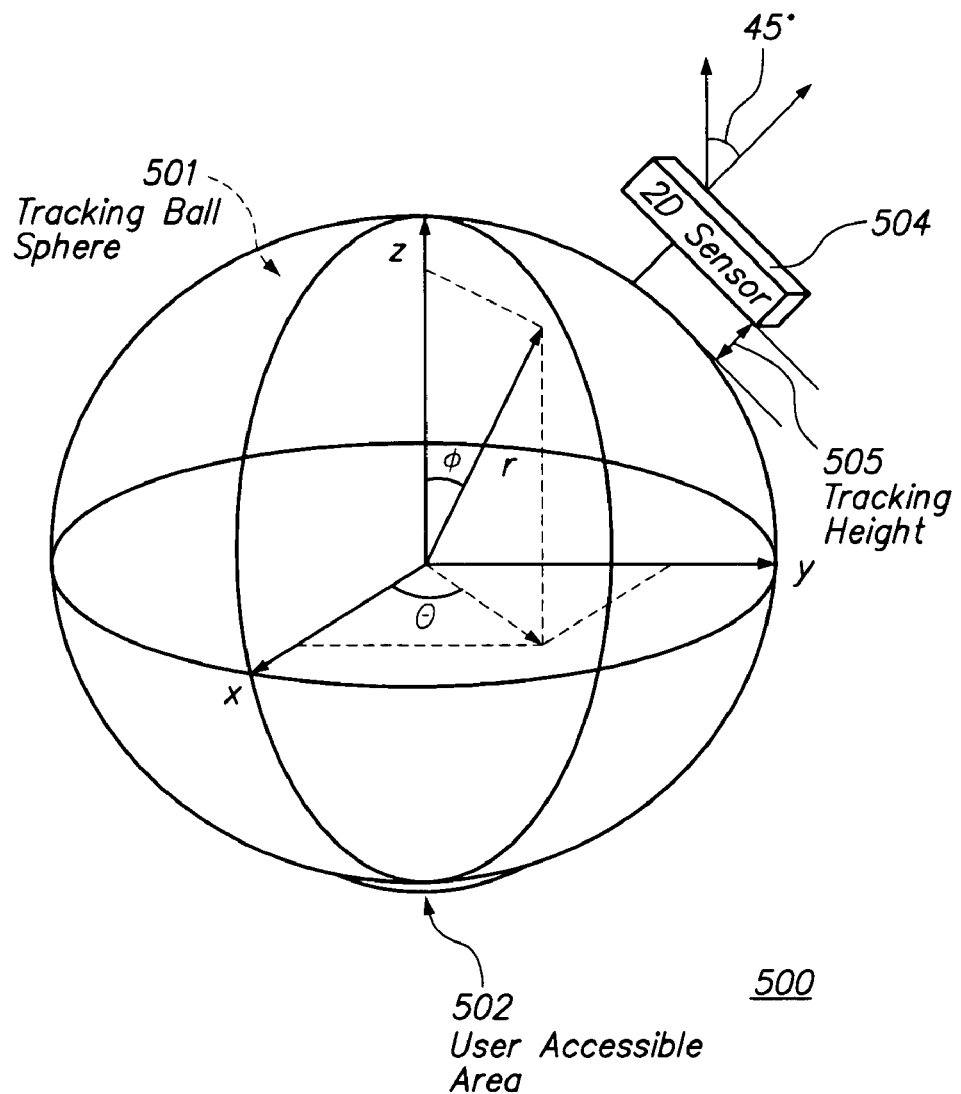
FIG. 5 is a schematic diagram of select components of a user input device with a sensor device positioned at an angle in accordance with an embodiment of the invention.

FIG. 5 is a schematic diagram of select components of a user input device 500 with a 2D sensor apparatus 504 positioned at an angle in accordance with an embodiment of the invention. More particularly, the 2D sensor apparatus 504 is positioned at an angle φ away from the positive z-axis, where the user-accessible area 502 of the tracking ball sphere 501 is centered on the negative z-axis. Again, the 2D sensor apparatus 504 is positioned a tracking height 505 away from the tracking ball sphere 501. For example, as illustrated, φ may be 45 degrees. More generally, it may be desirable to position the 2D sensor apparatus at an angle φ ranging from 30 degrees to 60 degrees.

Advantageously, with the 2D sensor apparatus 504 positioned at an angle as shown in FIG. 5, changes in θ become detectable. Hence, the user may generate θ motions that are measurable by the user input device 500.

CONCLUSION

As discussed above, the present application discloses methods and apparatus for overcoming or circumventing certain limitations of prior user input devices. Example embodiments are discussed above in relation to FIGS. 3, 4 and 5.

One embodiment provides a track ball input device with two (or more) 2D sensors to advantageously track full quasi 3D motions, which involve both changes in the θ or φ coordinates, and to eliminate a motion blind zone of a single sensor device. Further, tracking accuracy is improved.

A second embodiment provides a track ball input device with a reduced user-accessible touching area. This embodiment advantageously inhibits a user from generating θ motions and so also improves tracking accuracy.

A third embodiment provides a track ball input device with a sensor mounted at an angle to the z-axis. This embodiment advantageously allows the device to detect θ motions generated by a user.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A user input device for tracking motion, the device comprising:
    a tracking ball;
    a user-accessible touching area for user manipulation of the tracking ball;
    a first two-dimensional sensor positioned at a first tracking height away from and not in contact with the tracking ball, the first two-dimensional sensor further positioned across the tracking ball and opposite to the user-accessible touching area so as to form a z-axis there between, the first two-dimensional sensor configured to provide a first measurement that is sensitive to a zenith angle velocity of the tracking ball; and
    a second two-dimensional sensor positioned at a second tracking height away from and not in contact with the tracking ball, the second two-dimensional sensor configured to provide a second measurement that is sensitive to an azimuth angle velocity of the tracking ball,
    wherein a change in an azimuth angle of the tracking ball is determined based on the first measurement and the second measurement and
    wherein the first measurement and the second measurement determine displacement in a spherical coordinate system formed by the z-axis with an origin about the center of the track ball, the touch sense area positioned at a negative z-coordinate, the first two-dimensional sensor positioned at a positive z-coordinate at zenith position zero.

2. The user input device of claim 1, wherein the first two-dimensional sensor comprises a first optical beam output and a first optical sensor.

3. The user input device of claim 2, wherein the second two-dimensional sensor comprises a second optical beam output and a second optical sensor.

4. The user input device of claim 1, wherein the first two-dimensional sensor is positioned across the tracking ball and opposite to the user-accessible touching area for user manipulation of the tracking ball.

5. The user input device of claim 4, wherein the second two-dimensional sensor is positioned at an angle with respect to a z-axis which extends from the user accessible touching area through a center of the tracking ball to the first two dimensional sensor.

6. The user input device of claim 5, wherein said angle with respect to the z-axis is 90 degrees.

7. A method of tracking motion of a tracking ball sphere of a user input device, the method comprising:
- determining, using a first two-dimensional sensor positioned at a first tracking height away from and not in contact with the tracking ball, a first measurement corresponding to zenith velocity of the tracking ball sphere at a first tracking point of the tracking ball sphere, wherein the first tracking point is located across the tracking ball and opposite to a user-accessible touching area so as to form a z-axis there between;
- determining, using a second two-dimensional sensor positioned at a second tracking height away from and not in contact with the tracking ball, a second measurement corresponding to azimuth velocity of the tracking ball sphere at a second tracking point of the tracking ball sphere; and
- determining a change in an azimuth angle of the tracking ball sphere based on the first measurement and the second measurement,
- wherein the first measurement and the second measurement determine displacement in a spherical coordinate system formed by the z-axis with an origin about the center of the track ball, the touch sense area positioned at a negative z-coordinate, the first two-dimensional sensor positioned at a positive z-coordinate at zenith position zero.

8. The method of claim 7, wherein the first measurement corresponding to zenith velocity of the tracking ball sphere is determined using a first 2D optical motion sensor.

9. The method of claim 7, wherein the second measurement corresponding to azimuth velocity of the tracking ball sphere is determined using a second 2D optical motion sensor.

10. The method of claim 7, wherein said angle with respect to a z-axis is 90 degrees.

* * * * *